(12) United States Patent
Kiribuchi

(10) Patent No.: US 12,043,497 B2
(45) Date of Patent: Jul. 23, 2024

(54) TRANSPORT SYSTEM AND HOLDING APPARATUS

(71) Applicant: OMRON Corporation, Kyoto (JP)

(72) Inventor: Takeshi Kiribuchi, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 0 days.

(21) Appl. No.: 17/874,726

(22) Filed: Jul. 27, 2022

(65) Prior Publication Data

US 2023/0058371 A1 Feb. 23, 2023

(30) Foreign Application Priority Data

Aug. 20, 2021 (JP) ................................ 2021-134625

(51) Int. Cl.
*B65G 43/08* (2006.01)
(52) U.S. Cl.
CPC ...... *B65G 43/08* (2013.01); *B65G 2203/0283* (2013.01)
(58) Field of Classification Search
CPC . B65G 2207/02; B65G 2207/07; B65G 43/08
See application file for complete search history.

(56) References Cited

U.S. PATENT DOCUMENTS

| 11,376,968 B2 * | 7/2022 | Park | B60L 53/66 |
| 2004/0086364 A1 * | 5/2004 | Watanabe | B25J 9/0084 |
| | | | 414/416.01 |
| 2016/0226417 A1 | 8/2016 | Nomura et al. | |
| 2021/0229923 A1 * | 7/2021 | Schwanitz | B65G 41/002 |
| 2023/0042786 A1 * | 2/2023 | Zhang | B23P 19/02 |

FOREIGN PATENT DOCUMENTS

| JP | 2006130513 A | 5/2006 |
| JP | 2012007202 A | 1/2012 |
| JP | 2015057030 A | 3/2015 |

OTHER PUBLICATIONS

Uchiyama, WO 2020158050 A1 (Year: 2020).*

* cited by examiner

*Primary Examiner* — Gene O Crawford
*Assistant Examiner* — Lester Rushin, III
(74) *Attorney, Agent, or Firm* — ROSSI, KIMMS & McDOWELL LLP

(57) ABSTRACT

A technique allows efficient processing of workpieces to be transported (transportation objects). A transportation system includes a holder device transportable on a predetermined transportation path while holding a transportation object and a transportation device including the predetermined transportation path to transport the holder device on the predetermined transportation path. The holder device includes a processing device that performs a predetermined processing operation of the transportation object and a receiver that receives driving power for driving the processing device from the transportation device while the holder device is being transported by the transportation device. The transportation device includes a transmitter that transmits the driving power to the receiver.

5 Claims, 7 Drawing Sheets

TRANSPORT SYSTEM AND HOLDING APPARATUS

CROSS-REFERENCE TO RELATED APPLICATION

This application claims priority to Japanese Patent Application No. 2021-134625 filed on Aug. 20, 2021, the contents of which are incorporated herein by reference.

FIELD

The present invention relates to a transportation system for transporting a workpiece, and a holder device for holding a workpiece.

BACKGROUND

In a typical system for processing many workpieces, the workpieces undergo predetermined processing either when each workpiece reaches a predetermined place after being transported sequentially by a transportation device such as a belt conveyor, or while each workpiece is being transported. For example, Patent Literature 1 describes a technique used in such a processing system for workpieces being transported for heating and cooling. This processing system uses a heater for heating and a cooler for cooling. The heater and the cooler are moved relative to workpieces being transported to allow the workpieces to undergo processing without stopping the workpieces being transported. Patent Literature 2 describes the structure for cooling, during transportation of workpieces from a heating step to a hot-pressing step with a robot, selected workpieces with a holder cooler installed on a gripper arm of the robot.

For example, Patent Literature 3 describes a technique used in processing of workpieces, such as cutting, for maintaining the workpieces in an easily processable state. The technique uses a holder for holding workpieces including a heater and a cooler for heating and cooling the workpieces. This technique allows the workpieces to undergo processing such as cutting while the workpieces being heated or being cooled are maintained in a state appropriate for the processing.

CITATION LIST

Patent Literature

Patent Literature 1: Japanese Unexamined Patent Application Publication No. 2012-7202
Patent Literature 2: Japanese Unexamined Patent Application Publication No. 2006-130513
Patent Literature 3: Japanese Unexamined Patent Application Publication No. 2015-57030

SUMMARY

Technical Problem

For efficient processing of workpieces, a system for performing intended processing while the workpieces are being transported is useful. A processing device used for such a processing system is to receive driving power. A known processing device is installed at a predetermined position to receive power supply. The processing device is thus to be installed in a limited area, limiting the design flexibility of an environment for the processing of workpieces and thus obstructing efficient processing of workpieces.

In response to the above issue, one or more aspects of the present invention are directed to a technique for efficiently processing workpieces to be transported (hereafter referred to as transportation objects).

Solution to Problem

A transportation system according to one aspect of the present disclosure includes a holder device transportable on a predetermined transportation path while holding a transportation object and a transportation device including the predetermined transportation path. The transportation device transports the holder device on the predetermined transportation path. The holder device includes a processing device that performs a predetermined processing operation of the transportation object and a receiver that receives driving power for driving the processing device from the transportation device while the holder device is being transported by the transportation device. The transportation device includes a transmitter that transmits the driving power to the receiver.

In the above transportation system, the transportation device transports the holder device holding the transportation object to be processed. The holder device includes the processing device that performs the processing operation of the transportation object on the holder device (or in the holder device) while the holder device is being transported. More specifically, the transportation system performs the processing operation while the processing device, together with the transportation object, is being transported by the holder device.

The transmitter included in the transportation device transmits driving power to the receiver included in the holder device, and the receiver receives the driving power. In this manner, the processing device included in the holder device receives power supply. In this structure, the holder device may not prepare all the power for driving the processing device but may receive power while being transported by the transportation device. This minimizes any restrictions on the transportation of the transportation object to be processed due to power supply to the processing device, thus allowing flexible design of an environment for the processing operation of the transportation object and improving the processing efficiency.

Various known methods can be used for supplying power between the transmitter included in the transportation device and the receiver included in the holder device. Examples of such methods include a contactless power supply method. Examples of contactless power supply methods for a relatively near field include an electromagnetic induction method, a magnetic field resonance method, and an electric field coupling method. Examples of contactless power supply methods for a relatively far field include a microwave method and a laser method. The transmitter and the receiver each have the structure appropriate for a selected contactless power supply method. For the magnetic field resonance method, the transmitter and the receiver may each include a resonance circuit. For the microwave method, the transmitter and the receiver may each include an antenna.

The processing device may be a direct-current (DC) driving device or an alternating-current (AC) driving device. A device appropriate for the processing operation of the transportation object to be processed can be used. The holder device may include, as appropriate, a rectifier or a capacitor that charges driving power received by the receiver or a power converter for driving the processing device.

In the above transportation system, the transmitter may transmit a first signal being a radio signal indicating the driving power. The receiver may receive the first signal and extract the driving power. The structure according to the above aspect uses a contactless power supply method as a method for power supply between the transmitter included in the transportation device and the receiver included in the holder device. In one example, the transmitter may be located at a part or across the predetermined transportation path to transmit the first signal in response to the holder device reaching a predetermined position on the predetermined transportation path. In another example, the transmitter may transmit power for the predetermined processing operation to the receiver based on a transportation speed at which the holder device is transported by the transportation device. This structure allows supply of the driving power to the processing device based on transportation of the transportation object. Supplying power wirelessly is less likely to cause resistance in transporting the holder device, thus allowing an efficient processing operation.

In another aspect of the transportation system, the transmitter may be located at a part or across the predetermined transportation path to transmit a first signal indicating the driving power. The receiver may receive the first signal and extract the driving power in response to coming in contact with the transmitter while the holder device is being transported on the predetermined transportation path. The structure according to the above aspect uses contact power supply method as a method for power supply between the transmitter included in the transportation device and the receiver included in the holder device. The contact power supply method may cause resistance in transporting the holder device in an area of contact between the transmitter and the receiver. However, the area of contact allows power supply from the transportation device to the holder device in a more reliable manner.

In the transportation system according to any one of the above aspects, the transmitter may transmit a control signal. The control signal may be superimposed on the first signal to control a processing operation performed by the processing device. The receiver may separate the first signal transmitted by the transmitter into the driving power and the control signal and extract the driving power and the control signal. This structure can simultaneously transmit the driving power and the control signal for the processing device, thus allowing flexible design of processing operations of the transportation object. For example, the control signal superimposed on the driving power is adjusted in accordance with a place to which the transportation object is transported, thus allowing intended power supply and intended processing operations during transportation.

In the transportation system according to any one of the above aspects, the processing device may, for example, heat or cool the transportation object during the predetermined processing operation. In another example, the processing device may include a robot device that attaches a predetermined component to the transportation object during the predetermined processing operation. Any processing device other than these processing devices may be used. The robot device may receive the driving power through the receiver to pick the predetermined component located adjacent to the transportation device in response to the transportation object being transported to a predetermined position on the predetermined transportation path. This structure allows the robot device transported together with the transportation object to pick a predetermined component located at an intended predetermined position on the transportation device and to attach the component to the transportation object. In this case, the robot device or another device for providing each predetermined component to the transportation object may not be located adjacent to the transportation device, thus allowing an environment with less space to be designed for the processing operation.

In the transportation system according to any one of the above aspects, the transportation device may include a belt conveyor including a belt to receive the transportation object and a drive motor that drives the belt. Any transportation device other than the above transportation device may be used.

Another aspect of the present disclosure is directed to a holder device for holding a transportation object to be transported. More specifically, the holder device includes a compartment that houses the transportation object while holding the transportation object, a support supporting the compartment to allow the compartment to move on a predetermined transportation path on which the holder device is transportable, a processing device supported by the support to perform a predetermined processing operation of the transportation object, and a receiver that receives a radio signal indicating driving power for driving the processing device from the predetermined transportation path and extracts the driving power. The holder device with this structure minimizes any restrictions on the transportation of the transportation object to be processed due to power supply to the processing device, thus allowing flexible design of an environment for the processing operation of the transportation object and improving the processing efficiency.

In the above holder device, the radio signal transmitted from the predetermined transportation path may be superimposed with a control signal to control a processing operation to be performed by the processing device. The receiver may separate the radio signal transmitted from the predetermined transportation path into the driving power and the control signal and extract the driving power and the control signal. This structure can simultaneously transmit the driving power and the control signal for the processing device, thus allowing flexible design of processing operations of the transportation object. The technical ideas described using the transportation system are also applicable to the holder device when no technical contradiction occurs.

Advantageous Effects

The technique according to the above aspects allows efficient processing of workpieces to be transported (transportation objects).

DETAILED DESCRIPTION

Figure 1:
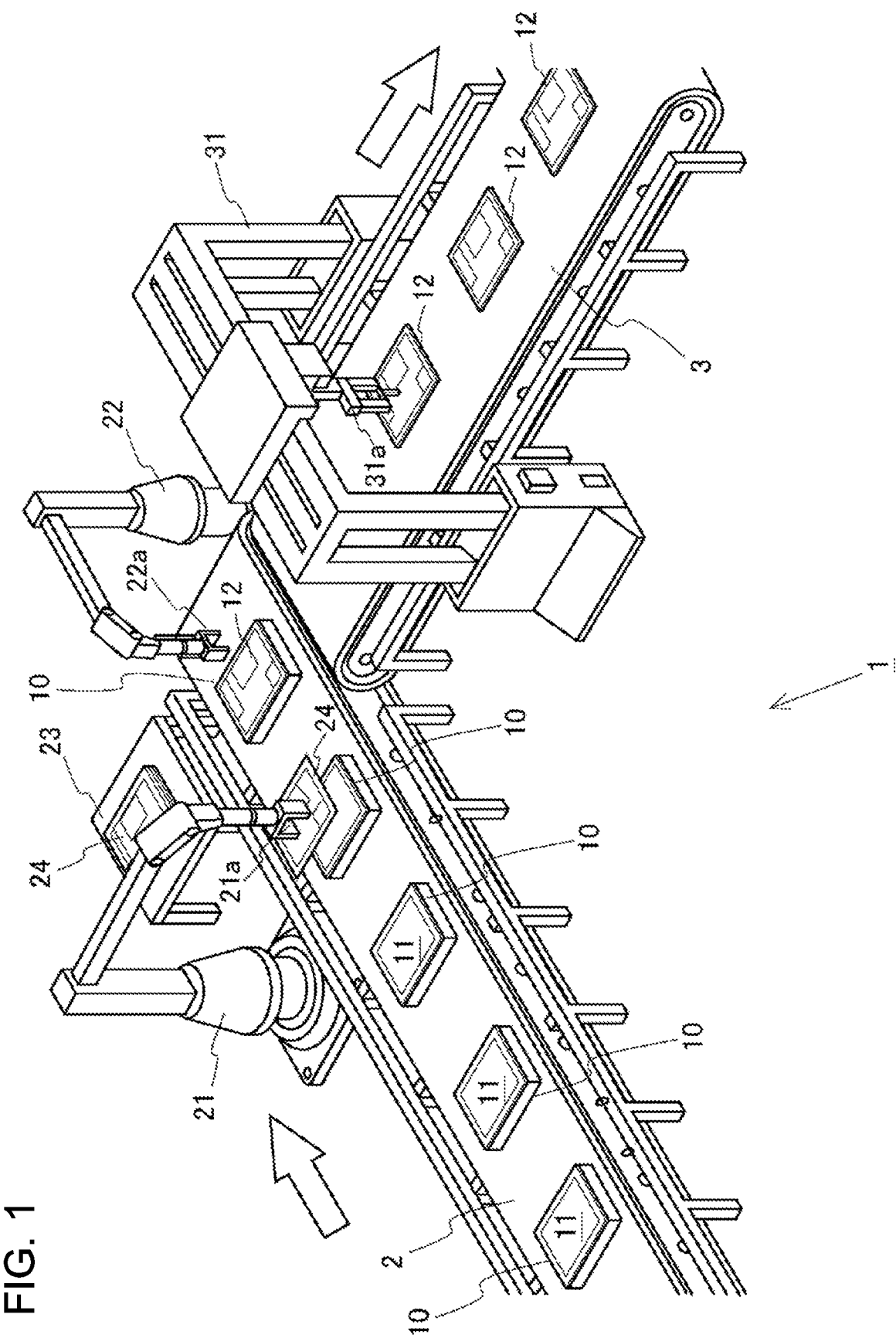
FIG. 1 is a first schematic diagram of a transportation system.

Embodiments of the present invention will now be described in detail with reference to the drawings. The same reference numerals denote the same or corresponding components in the drawings, and such components will not be described repeatedly. A transportation system used on a production line at a factory is used as an example of a transportation system according to one or more embodiments of the present disclosure.

First Embodiment

FIG. 1 is a schematic diagram of a transportation system 1 according to a first embodiment. The transportation system 1 includes holder devices 10 and a transportation device 2. The transportation system 1 further includes a transportation device 3. The transportation device 2 and the transportation device 3 each are a belt conveyor including a belt 2a on which transportation objects are placed and a drive motor 2b that drives the belt 2a (refer to FIGS. 3A and 3B). The transportation device 2 and the transportation device 3 each have a known structure as a device for transporting transportation objects. The structures of the transportation device 2 and the transportation device 3 will not be described in detail.

A processing operation of a transportation object performed in the transportation system 1 will now be described. Each holder device 10 (described below in detail) houses a transportation object 11 to be processed. In this state, the holder device 10 is placed on the belt of the transportation device 2. In the present embodiment, the holder devices 10 each housing a transportation object 11 (hereafter may also simply be referred to as holder devices 10) are transported on the belt of the transportation device 2 from the lower left toward the upper right in FIG. 1. A robot device 21 is installed at a predetermined position on the transportation device 2. The robot device 21 includes a hand device 21a as an end effector. The robot device 21 is controlled to grip a component 24 on a table 23 adjacent to the robot device 21 with the hand device 21a and position the gripped component 24 above the transportation object 11 housed in the holder device 10 reaching a predetermined position within the movable range of the robot device 21.

After positioning the component 24 above the transportation object 11, the robot device 21 presses the component 24 at a predetermined pressure with the hand device 21a. The holder device 10 is being transported on the transportation device 2. Thus, the robot device 21 presses the component 24 while controlling the hand device 21a in accordance with the transportation speed of the transportation device 2. Although the operation is described in detail later, the transportation object 11 housed in the holder device 10 undergoes heating and cooling to facilitate joining between the transportation object 11 and the component 24. In this manner, the transportation object 11 is joined with the component 24 by the robot device 21 into a primary finished product 12. When the holder device 10 housing the primary finished product 12 is transported to an end of the belt 2a of transportation device 2, another robot device 22 installed at the end picks the primary finished product 12 from the holder device 10 with its hand device 22a, and places the primary finished product 12 onto the belt of the transportation device 3, which can transport the primary finished product 12 in a direction different from the transportation direction of the transportation device 2.

The primary finished product 12 is then transported on the belt of the transportation device 3. The transportation device 3 is a belt conveyor, similarly to the transportation device 2. In the present embodiment, the primary finished product 12 is transported on the belt of the transportation device 3 from the upper left toward the lower right in FIG. 1. The transportation device 3 includes a gate-like inspection device 31 bridging over the belt surface. The inspection device 31 includes an inspection camera 31a, which photographs the primary finished product 12 transported on the belt surface from above, performs a predetermined inspection process for the joining of the component 24 performed in the previous step, and determines a post-process to be performed on the primary finished product 12 based on the inspection result.

In the transportation device 2 included in the transportation system 1 shown in FIG. 1, the component 24 is positioned by the robot device 21 with respect to the transportation object 11 housed in the holder device 10 and being transported on the belt 2a while undergoing predetermined heating and cooling. The transportation object 11 then undergoes a joining operation of joining the component 24 with the transportation object 11. The heating, the cooling, and the supply of power for each of the heating and the cooling will be described below.

Figure 2:
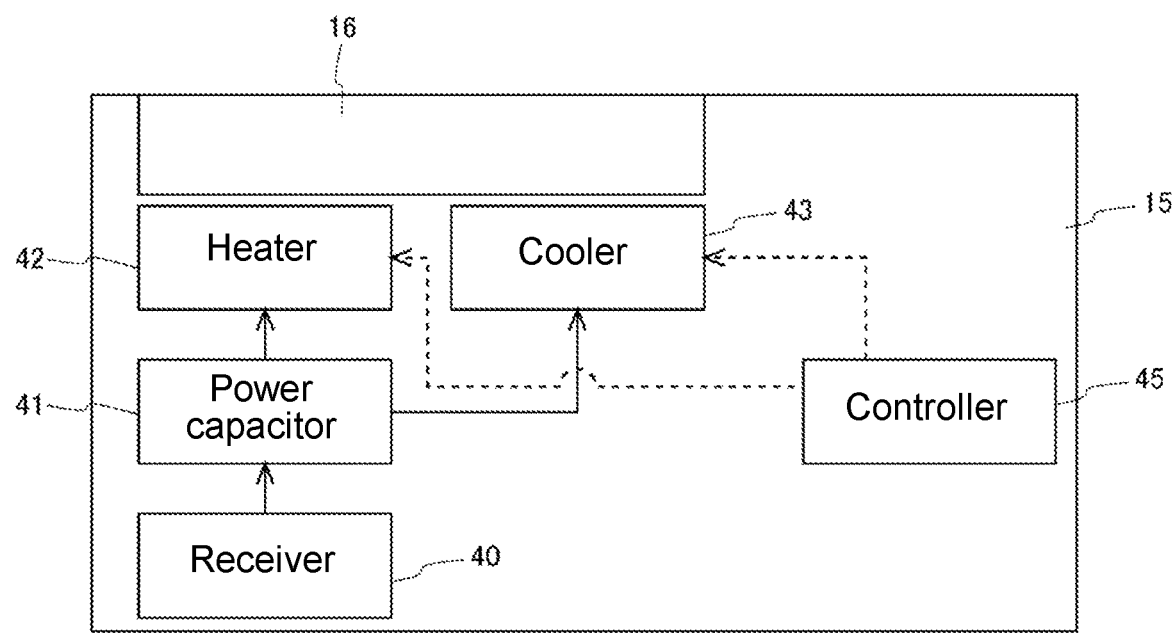
FIG. 2 is a first schematic diagram of a holder device.
Figure 2:

FIG. 2 shows a block diagram of the holder device 10. The holder device 10 includes a compartment 16 to house the transportation object 11, and a device body 15 that supports the compartment 16. The device body 15 corresponds to a support in an aspect of the present disclosure. The device body 15 is substantially rectangular. The compartment 16 is a recess on the upper surface of the device body 15. The compartment 16 has a depth smaller than the thickness of the transportation object 11 to be housed in the compartment 16.

The holder device 10 further includes a heater 42 and a cooler 43, each of which corresponds to a processing device in an aspect of the present disclosure. The heater 42 includes a heater element that operates on DC power for heating. The cooler 43 includes a Peltier element that operates on DC power for cooling. When DC power charged in a power capacitor 41 is supplied to the heater 42 and the cooler 43, the heater 42 performs heating, and the cooler 43 performs cooling. The transportation object 11 housed in the compartment 16 undergoes the heating and the cooling to join the component 24 with the transportation object 11 as described above. The heater 42 first heats the transportation object 11 to soften an adhesive pre-attached to the transportation object 11. Subsequently, the cooling is performed in place of the heating when the robot device 21 positions the component 24 above the transportation object 11 and presses the component 24. The adhesive is cured to facilitate joining of the component 24 with the transportation object 11. A controller 45 controls the heater 42 and the cooler 43 to perform the heating and the cooling described above. A memory included in the controller 45 prestores a program for the heating and the cooling. The program is loaded and executed at a predetermined time associated with the movement of the robot device 21 to perform the joining operation of the component 24 with the transportation object 11.

Figure 3A:
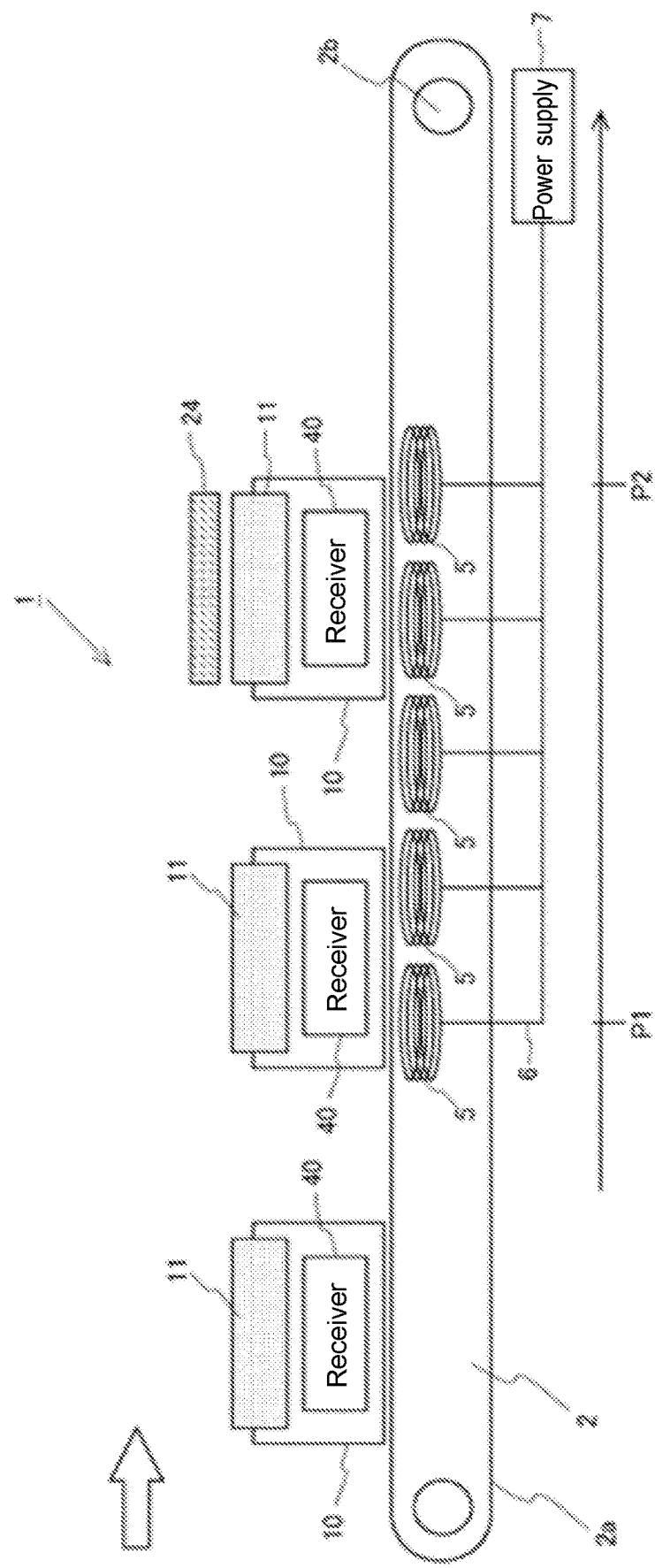
FIG. 3A is a first diagram describing supply of power between a transportation device and the holder device in the transportation system.

In the present embodiment, transmitters 5 included in the transportation device 2 shown in FIG. 3A transmit a radio signal indicating the driving power, and a receiver 40 included in each of the holder devices 10 receives the radio signal and extracts the driving power charged in the power capacitor 41 to generate the driving power. More specifically, the driving power for the heater 42 and the cooler 43 in the holder device 10 is supplied from the transportation device 2 with a contactless power supply method while the holder device 10 is being transported. The transportation device 2 includes an AC power supply 7. Each transmitter 5 then operates on AC power through a supply path 6. Each transmitter 5 is one of multiple transmitter coils for electromagnetic induction arranged in the transportation direction of the transportation device 2. For any receiver 40 being a receiver coil in the holder device 10 facing the transmitter coil in the transmitter 5, the driving power is transmitted from the transportation device 2 to the holder device 10 with an electromagnetic induction method, which is a method for contactless power supply between the transmitter 5 and the receiver 40. Power directly received by the receiver 40 is AC power. The AC power is thus converted to DC power through a rectifier circuit (not shown) after the power is received. The resultant power is then charged in the power capacitor 41. Another contactless power supply method may be a magnetic field resonance method. For this method, each transmitter 5 includes a resonance coil for transmitting power, and each receiver 40 includes a resonance coil for receiving power.

The driving power is supplied from the transportation device 2 to each holder device 10 with the contactless power supply method between transportation positions P1 and P2 in the transportation direction of the transportation device 2 as shown in FIG. 3A. More specifically, the transportation device 2 transports the holder devices 10 each housing the transportation object 11 to the transportation position P1. The transmitters 5 then start supplying power. The power supply continues until the holder devices 10 reach the transportation position P2. The power is used for the heating with the heater 42 and the cooling with the cooler 43. The transmitters 5 between the positions P1 and P2 (e.g., the distance between the positions P1 and P2 and the number of transmitter coils) are designed to charge power for the heating and the cooling in the power capacitor 41 in accordance with, for example, the transportation speed of the transportation device 2.

The transportation position P2 is an end position of the supply of the driving power with a contactless power supply method. The joining operation of the component 24 with the transportation object 11 includes an operation of the robot device 21 for positioning and pressing the component 24 as shown in FIG. 1. In some embodiments, the cooler 43 may perform the cooling when this operation is performed. The transportation position P2 is a position before the robot device 22 picks the primary finished product 12. In some embodiments, the transportation position P2 may be adjacent to a transportation position corresponding to the end of the pressing operation performed by the robot device 21.

In the transportation system 1 with this structure, each holder device 10 may not prepare all the power for driving the heater 42 and the cooler 43 but may receive power while being transported by the transportation device 2. This minimizes any restrictions on the transportation of the transportation object 11 and the processing operation such as the joining operation of the component 24 with the transportation object 11 due to power supply to the heater 42 and the cooler 43, thus allowing flexible design of an environment for the processing operation of the transportation object 11 and improving the processing efficiency.

Figure 3B:
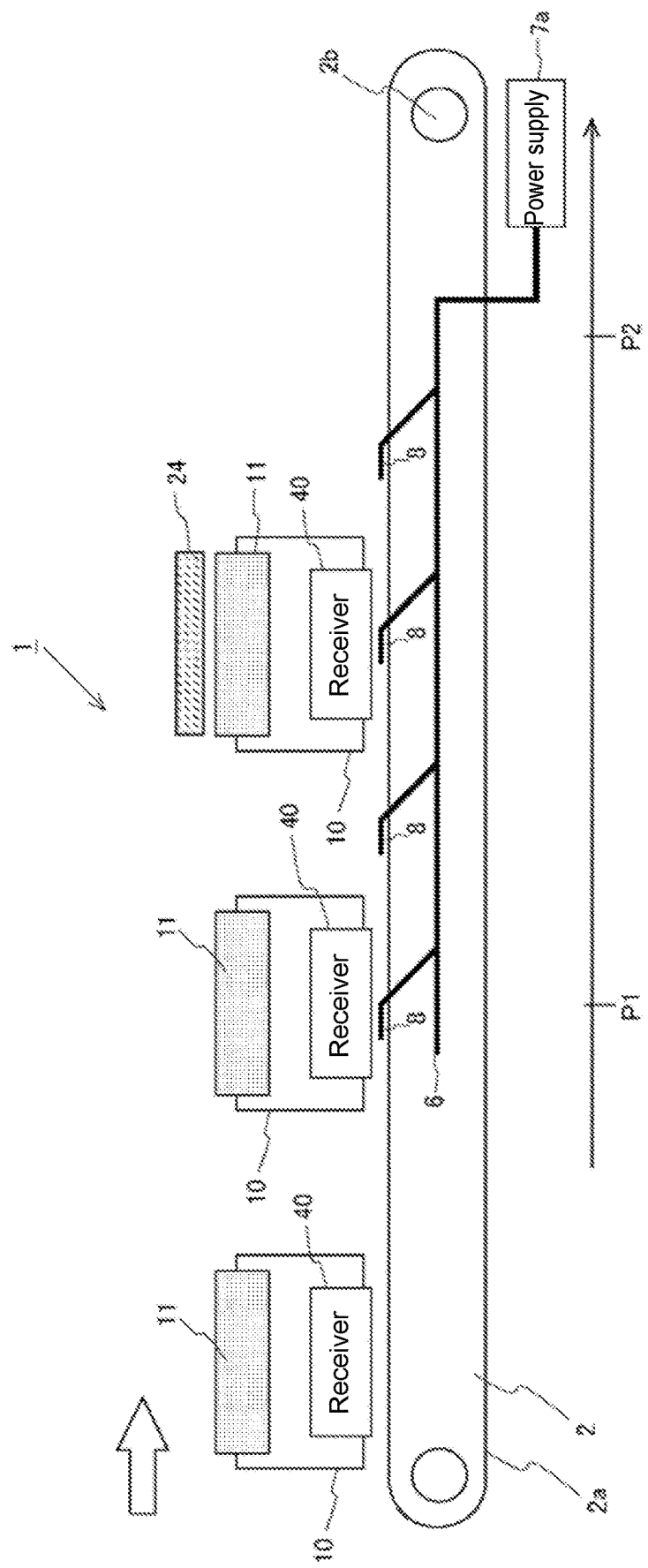
FIG. 3B is a second diagram describing supply of power between the transportation device and the holder device in the transportation system.

Another method for supplying driving power to the holder devices 10 from the transportation device 2 will be described with reference to FIG. 3B. FIG. 3B is a schematic diagram describing supply of power to holder devices 10 from a transportation device 2 in a transportation system 1 according to another embodiment. In the present embodiment, transmitters 8 in the transportation device 2 each transmit a driving power signal, and a receiver 40 in each holder device 10 receives and extracts the driving power signal. Unlike in the embodiment shown in FIG. 3A, power supply in the present embodiment is performed through direct contact of the transmitter 8 with the receiver 40. More specifically, the driving power for the heater 42 and the cooler 43 in the holder device 10 is supplied from the transportation device 2 with a contact power supply method while the holder device 10 is being transported. The transportation device 2 includes a power supply 7a. Each transmitter 8 is powered through the supply path 6. Each transmitter 8 is one of multiple contacts arranged in the transportation direction of the transportation device 2.

Each of the contacts serving as the transmitters 8 is exposed from the belt 2a of the transportation device 2 and slightly protrudes from the surface of the belt 2a. The receiver 40 in each holder device 10 transported on the belt 2a is exposed on the lower surface of the device body 15 (the surface in contact with the belt 2a). This structure allows each holder device 10 being transported on the belt 2a to sequentially come in contact with the transmitters 8 that are the contacts of the transportation device 2. As coming in contact with the transmitters 8, the holder device 10 receives DC power, which is charged in the power capacitor 41. Each contact protrudes by the length (the length in the transportation direction of the transportation device 2) designed to maintain the contact state of the transmitter 8 with the receiver 40 as intended. In some embodiments, each receiver 40 may be placed out of contact with the contacts in a sufficiently short period of time, and adjacent contacts may be at a distance at which the receiver 40 does not cause a short circuit between the two contacts.

Second Embodiment

Figure 4:
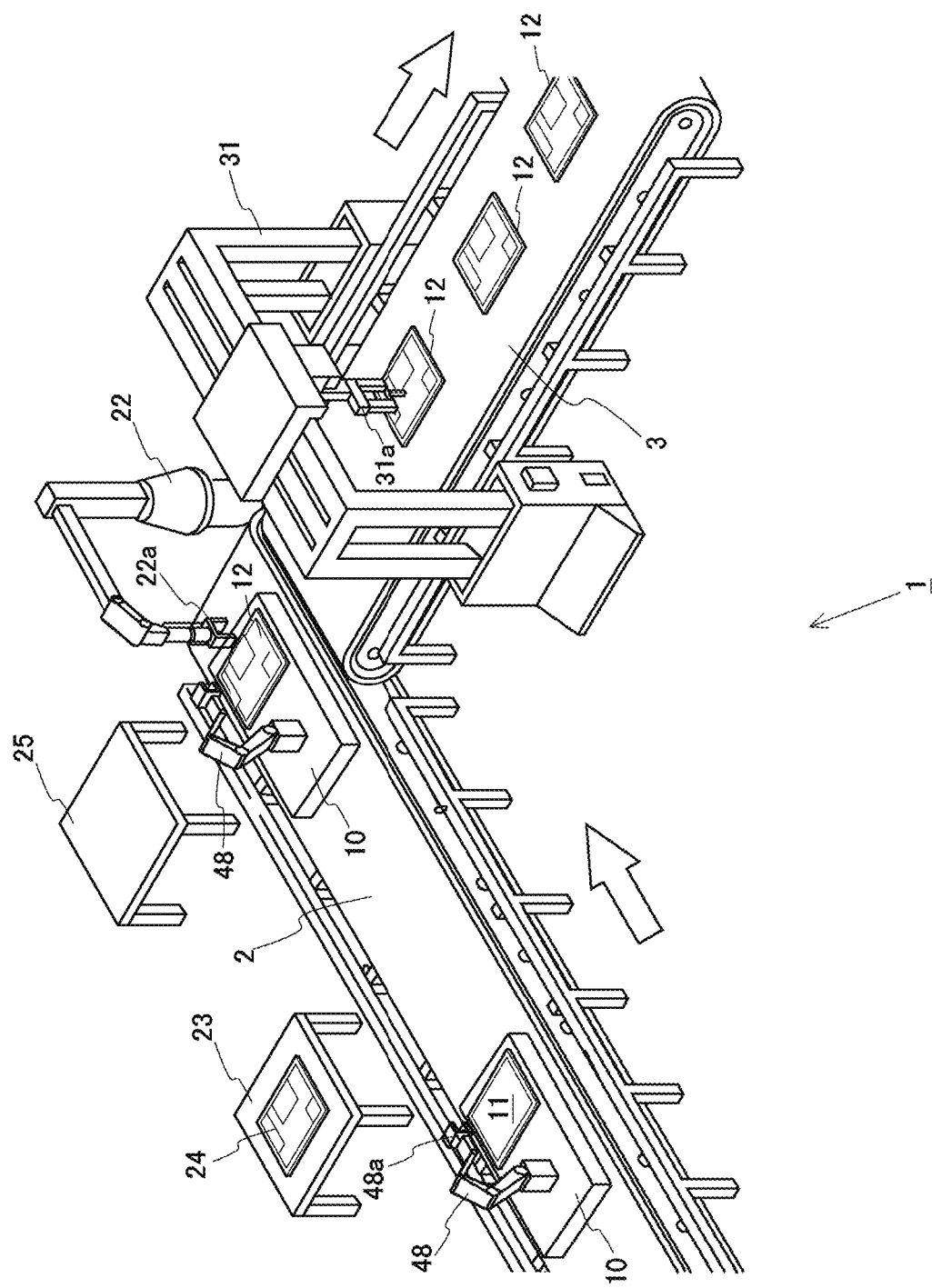
FIG. 4 is a second schematic diagram of a transportation system.

FIG. 4 is a schematic diagram of a transportation system 1 according to a second embodiment. The transportation system 1 includes holder devices 10, a transportation device 2, and a transportation device 3 as in the first embodiment. The transportation device 3 has substantially the same structure as the transportation device 3 in the first embodiment and will not be described.

A processing operation of a transportation object 11 performed in the transportation device 2 will now be described. As in the first embodiment, holder devices 10 each housing the transportation object 11 are placed on the belt of the transportation device 2. In the present embodiment, the holder devices 10 are transported on the belt of the transportation device 2 from the lower left toward the upper right in FIG. 4. Although the robot device 22 in the present embodiment is located at the end of the belt 2a in the transportation device 2 as in the first embodiment, the robot device 21 shown in FIG. 1 is replaced by alternative robot devices 48. The robot devices 48 are located on the holder devices 10 each housing the transportation object 11. Each robot device 48 is transported on the belt 2a together with the transportation object 11 housed in the holder device 10. Each robot device 48 includes a hand device 48a as an end effector. While being transported by the transportation device 2, the robot device 48 is controlled to grip a component 24 on a table 23 at a predetermined position near the transportation device 2 with the hand device 48a and position the component 24 above the transportation object 11 in response to the table 23 being within a movable range of the robot device 48. Although FIG. 4 shows a single table 23 on which the component 24 is located, multiple tables 23 may be arranged along the transportation device 2. Each robot device 48 may then sequentially pick a component from the tables 23 in accordance with the direction of transportation and perform an operation of the transportation object 11, such as positioning.

After the robot device 48 positions the component 24 above the transportation object 11, the robot device 48 presses the component 24 at a predetermined pressure with the hand device to join the component 24 with the transportation object 11. In the present embodiment, each robot device 48 is located on the holder device 10. The speed of the robot device 48 being zero relative to the transportation object 11 facilitates the pressing operation. This allows joining of the component 24 with the transportation object 11 without lowering the transportation speed of the transportation device 2. This largely contributes to shortening the tact time. In the present embodiment, each transportation object 11 undergoes heating and cooling to facilitate joining of the component 24 with the transportation object 11 housed in the holder device 10. The transportation object 11 is joined with the component 24 by the robot device 21 into a primary finished product 12. The robot device 22 picks the primary finished product 12 from the holder device 10 with the hand device 22a at the end of the belt 2a of the transportation device 2, and places the primary finished product 12 on the transportation device 3. The robot device 22 further grips the holder device 10 from which the primary finished product 12 is picked, and places the holder device 10 on a table 25 adjacent to the robot device 22.

Figure 5:
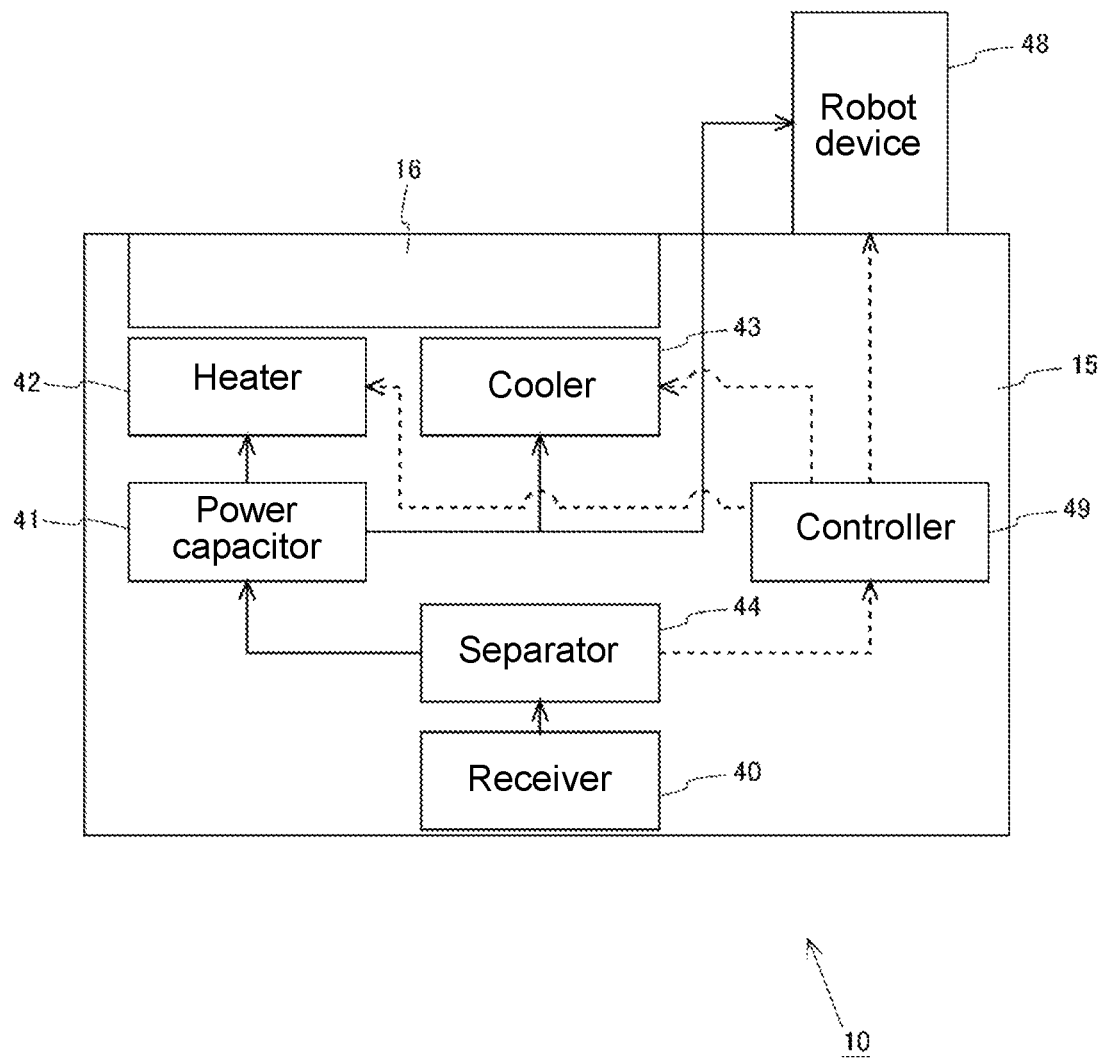
FIG. 5 is a second schematic diagram of a holder device.

The heating and the cooling for the joining operation of the component 24 with the transportation object 11 and the supply of power for controlling the robot devices 48 will now be described with reference to FIG. 5. FIG. 5 is a schematic diagram of the holder device 10 according to the present embodiment. The holder device 10 includes a device body 15 and a compartment 16 as well as a receiver 40, a power capacitor 41, a heater 42, and a cooler 43 as in the embodiment shown in FIG. 2. To drive an actuator in each robot device 48, the holder device 10 includes an electric power converter to convert DC power supplied from the power capacitor 41 to AC power. A controller 49 controls the heating, the cooling, and griping and pressing performed by the robot device 48 to join the component 24 with the transportation object 11 housed in the compartment 16.

In the present embodiment, a control signal for performing the heating and the cooling and driving the robot device 48 is provided from the transportation device 2 together with the driving power. When, for example, the transmitters 5 in the transportation device 2 transmit a signal indicating the driving power with the contactless power supply method as shown in FIG. 3A, the control signal for controlling the heater 42, the cooler 43, and the robot device 48 is superimposed on the signal indicating the driving power. Thus, the receiver 40 receives the signal indicating the driving power superimposed with the control signal. A separator 44 separates the signal received by the receiver 40 into the signal indicating the driving power and the control signal. The signal is separated with a known technique based on information about the frequency of the signal preset for driving power and control.

A control device (not shown), which may be a programmable logic controller (PLC), controls the transportation system 1 and generates the control signal for controlling the heater 42, the cooler 43, and the robot device 48. The control device can adjust the control signal based on parameters detected by various sensors in the transportation system 1 and a result of inspection from the inspection device 31. When, for example, the energization time of and the current to the heater 42 and the cooler 43 are adjusted in accordance with the result of joining of the component 24 with the transportation object 11 or when the positioning of the component 24 by the robot device 48 is unstable, the control device may adjust the acceleration conditions for a drive motor that drives the joints of the robot device 48 to adjust the control signal for the processing devices. The adjusted control signal is superimposed on the signal indicating the driving power in the transportation device 2. The transmitters 5 then transmit the signal to the controller 49 in each holder device 10 through the receiver 40.

This structure allows intended control in accordance with the processing situation of the transportation object 11 while supplying power to the processing devices such as the heater 42, the cooler 43, and the robot device 48 as intended. More specifically, the transportation system 1 according to the present embodiment can efficiently process the transportation objects 11 and also improve the precision of processing. The control signal superimposed on the signal indicating the driving power may be transmitted to selected ones of the devices included in the transportation system 1, instead of being transmitted to all the devices.

Third Embodiment

Figure 6:
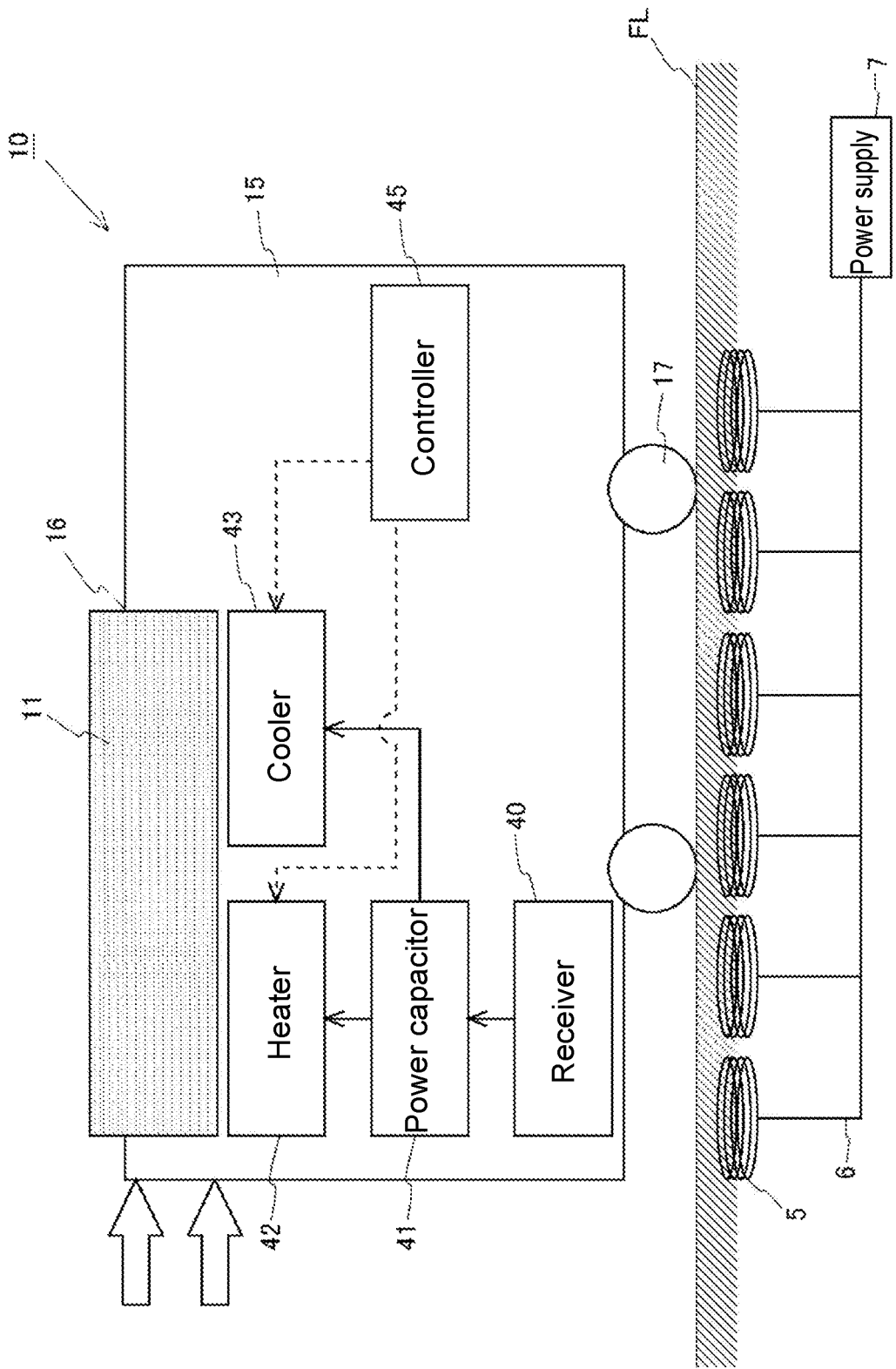
FIG. 6 is a third schematic diagram of a holder device.

FIG. 6 is a schematic diagram of a holder device 10 according to a third embodiment. The holder device 10 in the present embodiment includes a receiver 40, a power capacitor 41, a heater 42, a cooler 43, and a controller 45, similarly to the holder device shown in FIG. 2. The same reference numerals denote substantially the same components, and such components will not be described in detail.

In the present embodiment, the holder device 10 includes wheels 17 that movably guide a device body 15. The holder device 10 can thus move on a floor surface FL under an external force or with a device for generating a driving force such as a motor inside the holder device 10 (e.g., similarly to a vehicle). The transmitters 5 shown in FIG. 3A are embedded inside the floor surface FL and are powered by AC power from an AC power supply 7 through a supply path 6. When the holder device 10 moves on the floor surface with the above structure, the receiver 40 can receive driving power supplied from the transmitters 5 that are the transmitter coils. With the driving power being supplied, the processing devices such as the heater 42 and the cooler 43 can perform the processing operation of the transportation object 11 housed in the compartment 16. More specifically, the processing operation of the transportation object 11 can be performed without being affected by the manner in which the processing devices receive power supply. For example, the holder device 10 housing the transportation object 11 in the compartment 16 receives power supply from the transmitters 5 and thus can be transported while cooling the transportation object 11.

In some embodiments, the holder device 10 according to the present embodiment may have the same structure as the holder device shown in FIG. 5. In this case, the control signal for the processing device may be superimposed on the signal indicating the driving power. The power is supplied from the transmitters 5. The transportation object 11 can thus undergo a more appropriate processing operation.

APPENDIX 1

A transportation system (1), comprising:
a holder device (10) transportable on a predetermined transportation path (2a) while holding a transportation object (11); and
a transportation device (2) including the predetermined transportation path (2a), the transportation device (2) being configured to transport the holder device (10) on the predetermined transportation path (2a),
wherein the holder device (10) includes
   a processing device (42, 43, 48) configured to perform a predetermined processing operation of the transportation object (11), and
   a receiver (40) configured to receive driving power for driving the processing device (42, 43, 48) from the transportation device (2) while the holder device (10) is being transported by the transportation device (2), and
the transportation device (2) includes a transmitter (5, 8) configured to transmit the driving power to the receiver (40).

APPENDIX 2

A holder device (10) for holding a transportation object (11) to be transported, the holder device (10) comprising:
a compartment (16) configured to house the transportation object (11) while holding the transportation object (11);
a support (15) supporting the compartment (16) to allow the compartment (16) to move on a predetermined transportation path (2a) on which the holder device (10) is transportable;
a processing device supported by the support (15) and configured to perform a predetermined processing operation of the transportation object (11); and
a receiver (40) configured to receive a radio signal indicating driving power for driving the processing device (42, 43, 48) from the predetermined transportation path and extract the driving power.

The invention claimed is:

1. A transportation system, comprising:
a holder device transportable on a predetermined transportation path while holding a transportation object; and
a transportation device including the predetermined transportation path, the transportation device being configured to transport the holder device on the predetermined transportation path,
wherein the holder device includes
   a processing device configured to perform a predetermined processing operation of the transportation object, and
   a receiver configured to receive driving power for driving the processing device from the transportation device while the holder device is being transported by the transportation device,
wherein the transportation device includes a transmitter configured to transmit the driving power to the receiver,
wherein the transmitter transmits a first signal being a radio signal indicating the driving power, and the receiver receives the first signal and extracts the driving power, and
wherein the transmitter transmits power for the predetermined processing operation to the receiver based on a transportation speed at which the holder device is transported by the transportation device.

2. The transportation system according to claim 1, wherein
the transmitter transmits a control signal,
the control signal is superimposed on the first signal to control a processing operation performed by the processing device, and
the receiver separates the first signal transmitted by the transmitter into the driving power and the control signal and extracts the driving power and the control signal.

3. The transportation system according to claim 1, wherein
the processing device heats or cools the transportation object during the predetermined processing operation.

4. The transportation system according to claim 1, wherein
the processing device includes a robot device configured to attach a predetermined component to the transportation object during the predetermined processing operation, and
the robot device receives the driving power through the receiver to pick the predetermined component located adjacent to the transportation device in response to the transportation object being transported to a predetermined position on the predetermined transportation path.

5. The transportation system according to claim 1, wherein
the transportation device includes a belt conveyor including a belt to receive the transportation object and a drive motor configured to drive the belt.

* * * * *